United States Patent [19]

Graewe et al.

[11] 4,143,548

[45] Mar. 13, 1979

[54] MEASURING THE SPEED OF AN AIRCRAFT

[75] Inventors: Eberhard Graewe, Achim-Bierden; Siegfried Krajeweski, Stuhr, both of Fed. Rep. of Germany

[73] Assignee: Vereinigte Flugtechnische Werke-Fokker GmbH, Bremen, Fed. Rep. of Germany

[21] Appl. No.: 845,583

[22] Filed: Oct. 26, 1977

[30] Foreign Application Priority Data

Oct. 27, 1976 [DE] Fed. Rep. of Germany ....... 2648693

[51] Int. Cl.² ........................... G01P 5/00; G01F 1/66
[52] U.S. Cl. ................................ 73/181; 73/194 A; 73/189
[58] Field of Search ..................... 73/194 A, 189, 181

[56] References Cited

U.S. PATENT DOCUMENTS

| 2,274,262 | 2/1942 | Wolff | 73/194 A |
|---|---|---|---|
| 2,480,646 | 8/1949 | Grabau | 73/194 A |
| 2,515,221 | 7/1950 | Henning | 73/194 A X |
| 3,861,211 | 1/1975 | Dewan | 73/194 A |

Primary Examiner—Charles A. Ruehl
Attorney, Agent, or Firm—Smyth, Pavitt, Siegemund, Jones & Martella

[57] ABSTRACT

A continuous wave ultrasonic wave transmitter transmits modulated waves in two opposite directions being intercepted by a forward receiver and an aft receiver. The received signals are demodulated and the relative phase is used to obtain a speed reading. The wave length of the modulator signal must be larger than the two, preferably equal transmitter-to-receiver spacings. A similar but orthogonally arranged receiver system permits acquisition of a speed vector. Different modulation frequencies are to be used for different speed ranges; all these frequencies are transmitted simultaneously and selection of the desired one is made in the processing circuit only.

3 Claims, 3 Drawing Figures

MEASURING THE SPEED OF AN AIRCRAFT

BACKGROUND OF THE INVENTION

The present invention relates to measuring the speed of an aircraft by means of an ultrasonic transmitter and appropriately placed receivers.

The measurement of aircraft speed by means of ultrasonics is known generally. For this, a transmitter is suitably placed on the aircraft and two receivers are placed in foreward and aft direction from the transmitter i.e. in opposite directions along a line that runs parallel to the longitudinal center line or axis of the aircraft and at equal spacings from the transmitter. Due to the air flow along the craft a transmitted ultrasonic signal will arrive at the two receivers at different times. The transit time differential can be used directly to determine the speed of the craft relative to the ambient air.

In order to practice this method, it is customary to transmit the ultrasonic waves in the form of pulses, and transit time differences are determined on the basis of the pulse arrival times. Relatively high aircraft speeds can be measured in this manner quite accurately, particularly because transient effects at the respective pulse edges are negligible in relation to the detectible transit time differences. The situation is different in the case of medium or low speeds of e.g. VSTOL type aircraft when in a hovering phase at a rather low propagation speed. The initial transient phase at the onset of a pulse may falsify the measuring result up to by 20% or even more. For this reason, one has deemed this ultrasonic speed measurement as unsuitable for vertical take off and landing crafts.

DESCRIPTION OF THE INVENTION

It is an object of the present invention to provide a new method and system for measuring the speed of an aircraft relative to ambient air which method and system are equally applicable to very low as well as very high speeds, whereby "very low" is to be understood literally, i.e. includes forward speeds of a VTSOL at landing and take off.

It is a specific object of the present invention to improve aircraft speed measuring systems which employ an ultrasonic transmitter as well as two receivers spaced from the transmitter along a line that runs parallelly to the longitudinal axis of the aircraft.

In accordance with the preferred embodiment of the invention it is suggested to operate the transmitter on a continuous basis for radiating frequency modulated ultrasonic signals towards the two receivers. The phase differences between transmitter signal and receiver signals are used to calculate transit time differences from which the speed of the craft is calculated. Moreover, the modulating signal has a frequency with a wavelength larger than, preferably twice the distance between transmitter and either receiver.

It was found that this type of equipment and system permits aircraft speeds to be measured down to a few centimeters per second up to several hundred meters per second. One will preferably use different frequencies for purposes of the modulation in order to obtain different measuring ranges. These different modulations are applied simultaneously to and transmitted by the transmitter, and they are all received by the receivers. The receivers include adjustable filters to separate but one of these frequencies from the demodulated signal. A change in measuring range does not, therefore, involve the ultrasonic components (transmitting and receiving transducers), but requires merely changes in the electric circuit, such as switching the filters over to a different passing range.

In the case one wishes to compensate more accurately windspeed and/or to compensate for a non zero angle between the longitudinal axis of the craft and the actual direction of propagation, one may supplement the system through two orthogonally arranged receivers to obtain a speed vector. This is important particularly during hovering i.e. during starting and landing of VSTOL type aircraft when the craft is quite obliquely oriented to the actual direction of propagation.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings FIG. 1 illustrates a bidirectional (or omnidirectional) ultrasonic transmitter which transmits frequency modulated ultrasonic waves, basically on a continuous basis as far as the operation is concerned. Any intermittency has nothing to do with pulsation as beginning and end of such a "pulse" would be disregarded. For convenience sake continuous operation is presumed, as any transmission onset will be disregarded.

Figure 1:
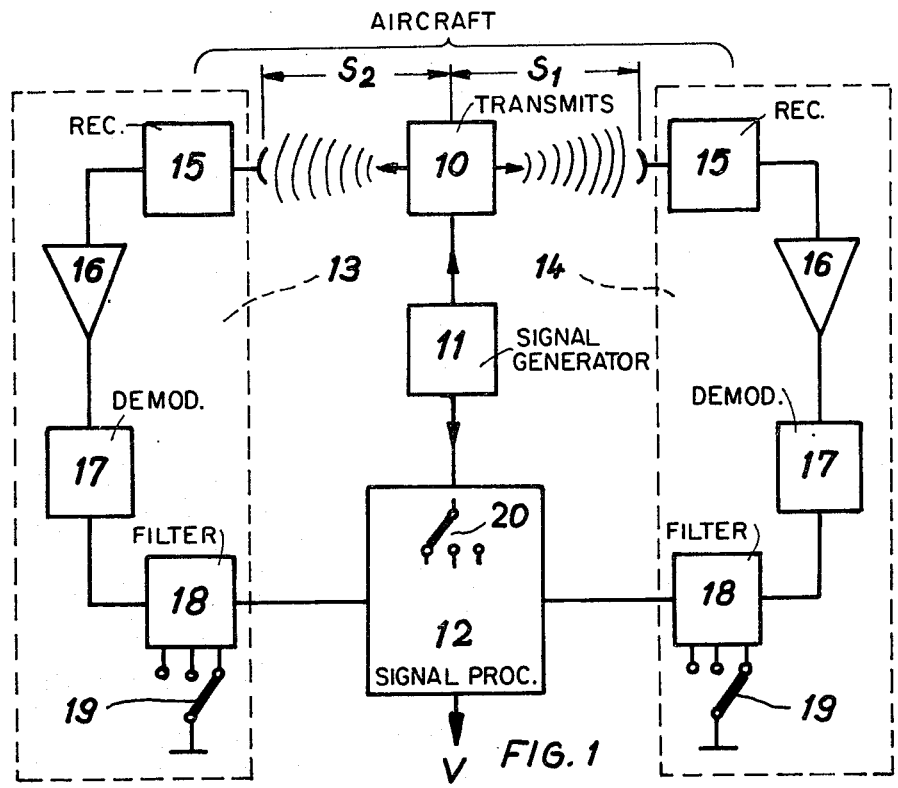
FIG. 1 is block diagram of a measuring system in accordance with the preferred embodiment.

The transducing device 10 which generates and transmits ultrasonic waves is driven as to modulation by a signal generator 11 which provides at least one particular modulating frequency for purposes of frequency modulation of the ultrasonic waves prior to transmission. The same modulation signal is also applied to an evaluating circuit 12 to be described more fully below. For practical reasons, particularly for purposes of range extension and coverage, generator 11 provides actually three different modulation frequencies which may well be harmonics of each other, but should be spaced in frequency to permit ready separation by filtering. The ultrasonic vibrations are however modulated by all three modulation frequencies. These frequencies should be chosen to fall in a range which is at least substantially free from noise frequencies of the aircraft and its engines.

As far as the transmitted signals are concerned, two beams are being launched, in opposite direction and along a direction parallel to the longitudinal axis of the aircraft. Thus, the transmitter 10 (at least the ultrasonic wave generating transducer) is presumed to be placed on the fuselage and in vertical alignment with the longitudinal axis of the craft. Those beams are received by two similar receivers 13 and 14 spaced at distances $S_1$ and $S_2$ from the transmitter and on said direction. The two receivers, or more particularly the ultrasonic transducer portions and detectors of these receivers are placed on a line that runs parallel to the longitudinal axis of the craft and runs also through the transmitter.

Each receiver has such a receiving transducer 15 which converts ultrasonic vibrations into electrical signals. These signals are amplified by an amplifier 16 to a more suitable level, the amplifier providing also impedance matching function. The amplified signal is demodulated in a stage 17. It will be appreciated that signals as received include the three modulating frequencies, so that the demodulators provide a composite signal of those three frequencies.

A filter 18 is connected to the output side of each demodulator. These filters are adjustable as to passband and for each adjustment they permit passage of but one of the frequencies. The selection of the appropriate measuring range is done by adjusting the filters 18 to the pass-band for the most appropriate modulation frequency for that range. Thus, the range adjustment does not involve the ultrasonic transducers in the transmitter and the receivers so that transients are not produced in the transmission link when the range is changed. Switching of the filters involves very little transient effects.

The filtered demodulated signal is fed to an evaluating stage 12. This stage compares the phases of the demodulated signals from the two receivers 13, 14 with the modulating signal from generator 11, and the difference between the two resulting phase differences is used to generate a speed indicating signal. As symbolically indicated by switch 20, only one out of the three modulator frequencies as supplied by generator 11 is effective in the evaluating stage 12. That selective adjustment is of course commensurate with the selection of the appropriate filter circuits in the receiver.

Generally speaking, the evaluating stage compares the phase of the modulation signal as selected and generated, with the phase of each of the two demodulated and filtered signals. The phase differences generally are indicative of the transit times between transmitter and receivers which, on the basis of the known distances between the transmitter and the receivers are indicative of the actual propagation speed of the ultrasonic waves since the speed of the craft is added to the propagation speed through air for one beam and subtracted for the other beam, and the transit time differential is indicative of the air craft speed.

The spacings $S_1$ and $S_2$ between transmitter and receivers are now chosen to be (a) equal and (b) equal to half a wave length ($\lambda/2$) of one of the modulation signals. Therefore, as long as the craft is at rest, the receiver signals are necessarily in phase (due to (a)), and 180° out of phase in relation to the transmitter signal, due to (b). The curves 25 and 26 represent the sine of this phase angle of the modulation signal as transmitted and in dependance upon the distance from the transmitter. These curves teach that the phases of the modulation signal are equal at equal distances from the transmitter, including the locations ($S_1=S_2$) of the two receivers. This, however, holds true only for air speed zero. Generally speaking, but still considering the air speed zero (craft speed zero) situation, the transit times of any given phase of the modulation signals are equal. This is true irrespective of the actual phase considered, and is true also independently from the fact that the transmitter receiver spacings are equal to half a wave length. If that latter condition is fulfilled in addition, then the receiver signals have not only equal phase but are in direct phase opposition to the modulation signal as effective in the transmitter. The evaluating circuit 12 may include two phase discriminators each attuned, e.g. to produce a particular output (e.g. zero) if the signals they respectively compare are out 180° of phase.

Different modulation frequencies will not of course satisfy the rule that the receiver transmitter spacing is equal to half a wave length, but the rule $\lambda > S$ must be satisfied to avoid ambiguity. However, zero speed will, for each chosen frequency, establish a particular phase relation between transmitter and receiver modulation waves. The discriminators must be adjusted accordingly for example by introducing particular fixed phase shifts into the modulator signal from generator 11.

Now consider the case of a moving craft which is equivalent to a relative movement of the ultrasonic signal propagation medium (i.e. ambient air) in the opposite direction. As a consequence the actual propagation speed of one beam is additively incremented by the relative speed between the air and the craft, while the actual propagation speed of the other beam is decremented. This means that the phase-curves of the modulation signal are distorted as per curves 25' and 26'. These curves teach that the forward receiver receives a lagging signal and the rearward receiver receives a leading signal. Accordingly, the signals as received by the two receivers are respectively $\phi_1$ and $\phi_2$ displaced from the 180° phase shifted transmitted modulation signal which serves as reference point for this particular phase measurement, whereby actually $\phi_1 = \phi_2$. The outputs of the two phase discriminators in unit 12 will indicate these phase shifts. It should be considered that these outputs $\phi_1$ and $\phi_2$ will have opposite signs, and which is positive and negative depends upon which signal leads and which lags from the 180° out of phase situation defining the zero point for this particular phase measurement. A negative summation of the two discriminator outputs sums the absolute values and yields a direct indication of the speed of the aircraft (i.e. of the transmitter, receiver sets) relative to the propagation medium air, whereby the sign of that combined output is indicative of the direction of relative movement. It should be noted that the phase discrimination and further signal processing may well be carried out digitally, which is of particular advantage if the generator 11 does, in fact, generate the modulation signals on a digital basis.

Figure 2:
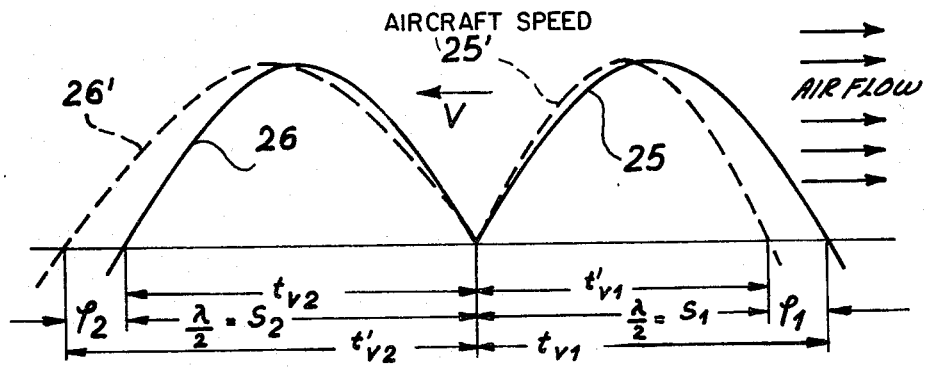
FIG. 2 is a signal diagram for explaining the operation of the system of FIG. 1.

It can readily be seen that the phase shift the demodulated receiver signals have undergone, is actually the result of a difference in actual propagation speed. As schematically indicated in FIG. 2, the transit time of any particular phase of the modulation signal is shortened from $t_{v1}$ to $t'_{v1}$ in the rearwardly placed receiver and extended from $t_{v2}$ to $t'_{v2}$ (general case) for the forwardly placed receiver. Of course, in the assumed special case of equal values for the receiver spacings, $t_{v1} = t_{v2}$ and $t_{v1} - t'_{v1} = t'_{v2} - t_{v2} = \Delta t$. Since t. time and transit time differentials are proportionate to the ascertained phase and phase differences, one can readily ascertain the transit time and transit time difference from the measured phase difference from which one ascertains the speed of the craft. The speed V the craft is related to the transit time differences on the basis of the following formula:

$$V = \frac{1}{2}\left(\frac{S1}{t_{v1}} - \frac{S2}{t_{v2}}\right)$$

Since $S1 = S2 = S$, and since for speed $V = 0 = t_{v1} = t_{v2} = t$, the formula reduces to $$V = \frac{S}{2}\left(\frac{1}{t - \Delta t} - \frac{1}{t + \Delta t}\right)$$

wherein $\Delta t$ is the transit time differential introduced above. Since $\Delta t^2 << t^2$ that formular reduces to $V = S/2\, \Delta t$ being proportional to the phase differential $1 - 2$, which is actually the sum of the absolute values of the two phase shifts.

It was found that the measurement yields speed indication from a few centimeters per second up to hundreds of meters per second.

Figure 3:
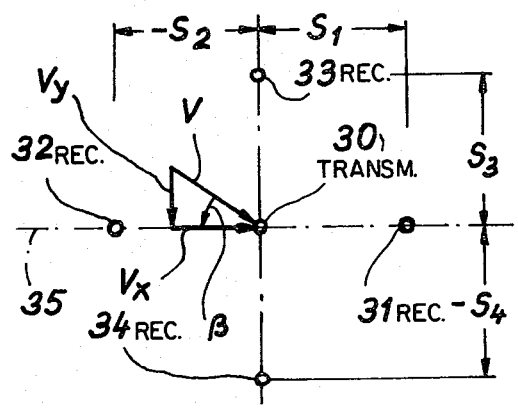
FIG. 3 is a schematic view of a system using a single transmitter and four receivers for ultrasonics signals to obtain a speed vector.

FIG. 3 shows a supplemented system to obtain a speed vector. A centrally located ultrasonic transmitter 30 radiates towards four ultrasonic receivers, 31, 32, 33 and 34. Transmitter 30 is (at least in a horizontal plane) omnidirectional. Reference numeral 35 refers to the longitudinal axis of the aircraft. The speed vector of the craft may actually have direction and magnitude of vector V. That vector has two components Vs and Vy on the basis of coordinate directions x and y respectively defined by receiver pairs 31, 32 and 33, 34. The distances between the transmitter and the four receivers are respectively denoted S1, S2, S3 and S4 so that, for the general case $$Vx = \frac{1}{2}\left(\frac{S1}{t_{v1}} - \frac{S2}{t_{v2}}\right) = V \cdot \cos\beta$$

$$Vy = \frac{1}{2}\left(\frac{S3}{t_{v3}} - \frac{S4}{t_{v4}}\right) = V \cdot \sin\beta$$

wherein $\beta$ is the angle between the craft's axis 35 and the true flight direction. This angle may be noticably different from zero in the case of a hovering flight. If $S1 = S2 = S3 = S4$, the formulas reduce to:

$$Vx = \frac{S}{2}\left(\frac{1}{t_{v1}} - \frac{1}{t_{v2}}\right)$$

$$Vy = \frac{S}{2}\left(\frac{1}{t_{v3}} - \frac{1}{t_{v4}}\right) \text{ and}$$

$$V = \frac{S}{2}\sqrt{\left(\frac{1}{t_{v1}} - \frac{1}{t_{v2}}\right)^2 + \left(\frac{1}{t_{v3}} - \frac{1}{t_{v4}}\right)^2}$$

while $\beta$ equals to the arc tans of the ratio of the expression in brackets.

The invention is not limited to the embodiments described above but all changes and modifications thereof not constituting departures from the spirit and scope of the invention are intended to be included.

We claim:

1. A system for measuring the speed of an aircraft having a longitudinal axis, comprising:
   an ultrasonic transmitter on the aircraft including means for continuously transmitting ultrasonic waves at least in two oppositely oriented directions along the longitudinal axis of the aircraft;
   means included in the transmitter for providing frequency modulation by at least one modulation frequency having a particular wavelength so that said ultrasonic signals as transmitted are frequency modulated by said modulation frequency;
   a pair of ultrasonic receivers respectively disposed to intercept the waves as transmitted by the transmitter in the said two opposite directions, said receivers being spaced from the transmitter by distances smaller than said wavelength;
   means included in the receivers for demodulating the signals as detected by the receivers; and
   means for determining the phases of demodulation signals as produced by the means for demodulating and for determining the speed of the aircraft on the basis of the determined phases.

2. A system as in claim 1, and including a second pair of receivers placed orthogonally to said pair, and circuit means connected to the receivers to obtain a speed vector.

3. A system as in claim 1, wherein the means for modulating provides plural modulation at different frequencies, said receivers including adjustable filters to select one frequency from the demodulation signals, a different frequency among the plural frequencies being selected for a different measuring range.

* * * * *